United States Patent
Cselle

(10) Patent No.: US 6,261,034 B1
(45) Date of Patent: Jul. 17, 2001

(54) BORING BIT

(76) Inventor: Tibor Cselle, Hohenstaufen 9, D-72488, Sigmaringen (DE)

( * ) Notice: Subject to any disclaimer, the term of this patent is extended or adjusted under 35 U.S.C. 154(b) by 0 days.

(21) Appl. No.: 09/381,627

(22) PCT Filed: Mar. 25, 1997

(86) PCT No.: PCT/EP97/01520

§ 371 Date: Feb. 22, 2000

§ 102(e) Date: Feb. 22, 2000

(87) PCT Pub. No.: WO98/42469

PCT Pub. Date: Oct. 1, 1998

(51) Int. Cl.$^7$ .................................................. B23B 51/00
(52) U.S. Cl. ............................ 408/230; 408/57; 408/229; 408/705
(58) Field of Search ....................... 408/57, 59, 144, 408/223, 227, 229, 230, 705

(56) References Cited

U.S. PATENT DOCUMENTS

| | | | |
|---|---|---|---|
| 4,826,368 | * 5/1989 | Tikal et al. | 408/225 |
| 4,971,485 | * 11/1990 | Nomura et al. | 408/144 |
| 5,181,811 | * 1/1993 | Hosoi | 408/230 |
| 5,399,051 | * 3/1995 | Aken et al. | 408/230 |
| 5,636,948 | * 6/1997 | Rexius | 408/224 |
| 5,685,673 | * 11/1997 | Jarvis | 408/230 |
| 5,788,431 | 8/1998 | Basteck . | |
| 6,012,881 | * 1/2000 | Scheer | 408/230 |

FOREIGN PATENT DOCUMENTS

| | | |
|---|---|---|
| 0 749 794 | 6/1996 | (EP) . |
| 2 260 283 | 4/1993 | (GB) . |
| 0237713 | * 9/1990 | (JP) ..................... 408/144 |
| 319407 | * 1/1972 | (RU) ..................... 408/230 |
| 1151375 | * 4/1985 | (SU) ..................... 408/230 |
| 001682050 | * 10/1991 | (SU) ..................... 408/230 |
| 0567560 | * 8/1997 | (SU) ..................... 408/230 |
| WO 97/04908 | 2/1997 | (WO) . |

OTHER PUBLICATIONS

"Kelgelförmiger Spiralbohrer mit rechtsdrehender Bewegung zur Bearbeitung von Metall, Holz od.dgl. Material." 24. Januar 1969, with Excerpt Translation from DE Utility Model Application 6908072.

Die wirtschaftliche Fertigung von Bohrlöchern und Bohrungen, Das Industrierblatt, 58,. Jahrgang 1958, Heft 10...12; with Excerpt Translation.

Möglichkeiten zur Anpassung des Bohrwerkzeugs an die Bearbeitungsaufgabe, VDI–Z 121 (1979) Nr. 1/2–Januar (I/II) with Excerpt Translation.

* cited by examiner

*Primary Examiner*—A. L. Wellington
*Assistant Examiner*—Monica S. Carter
(74) *Attorney, Agent, or Firm*—Oblon, Spivak, McClelland, Maier & Neustadt, P.C.

(57) ABSTRACT

A boring bit, especially a multi-blade boring bit. The bit preferably has a point symmetric cutting edge arrangement having main and secondary cutting edges that are tilted towards the axis of the boring bit. In order to stabilize the tool against vibrations cased by the cutting force, the secondary cutting edge is tilted along an effective length that is substantially axial in the direction of cutting thereby having a negative tool side rake.

18 Claims, 9 Drawing Sheets

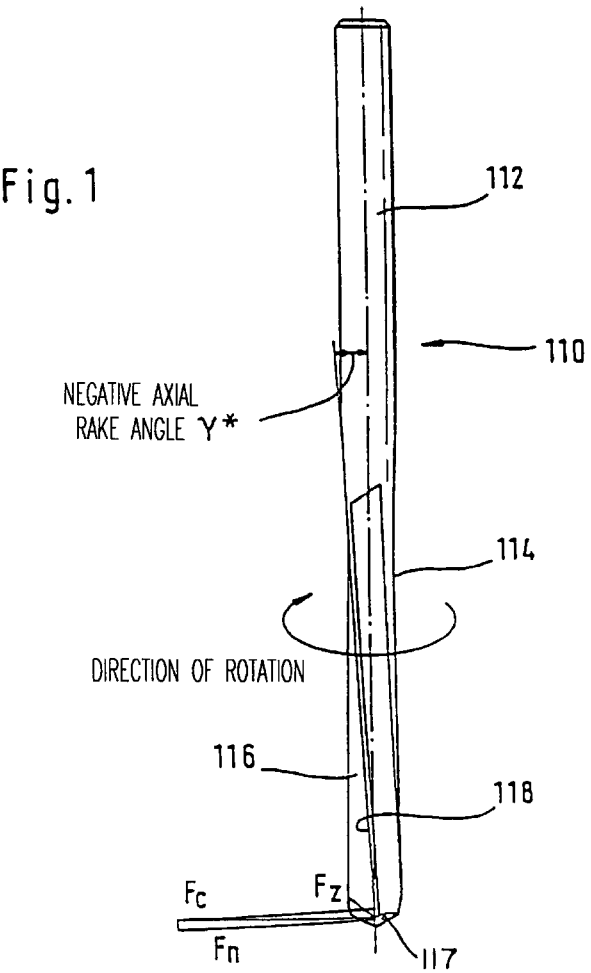
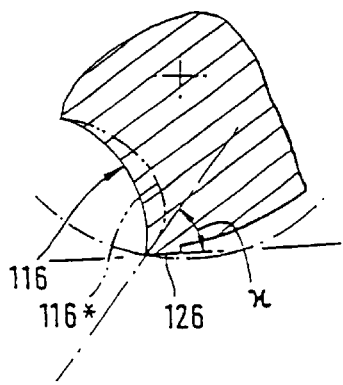
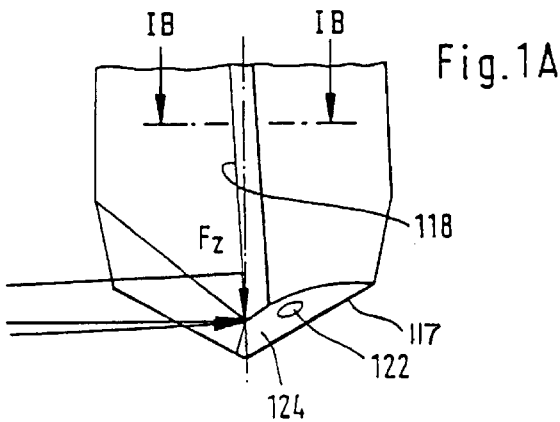
Fig. 1
Fig. 1B
Fig. 1A

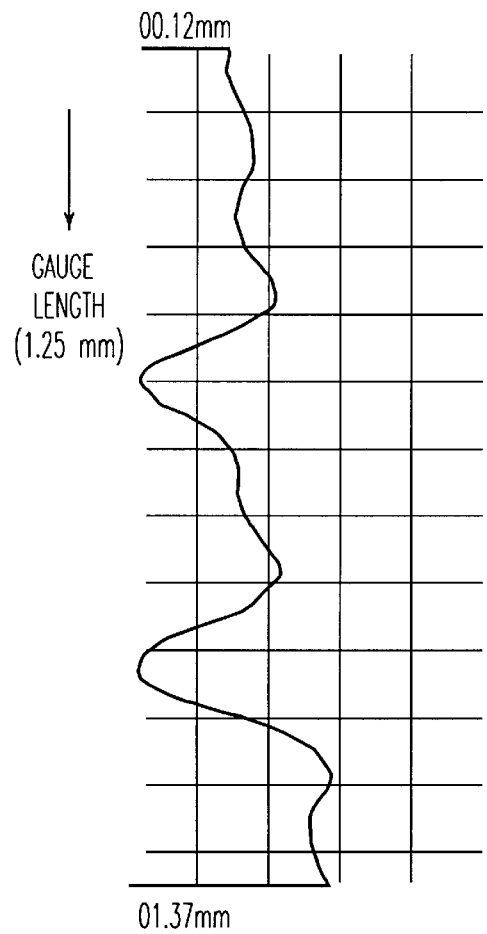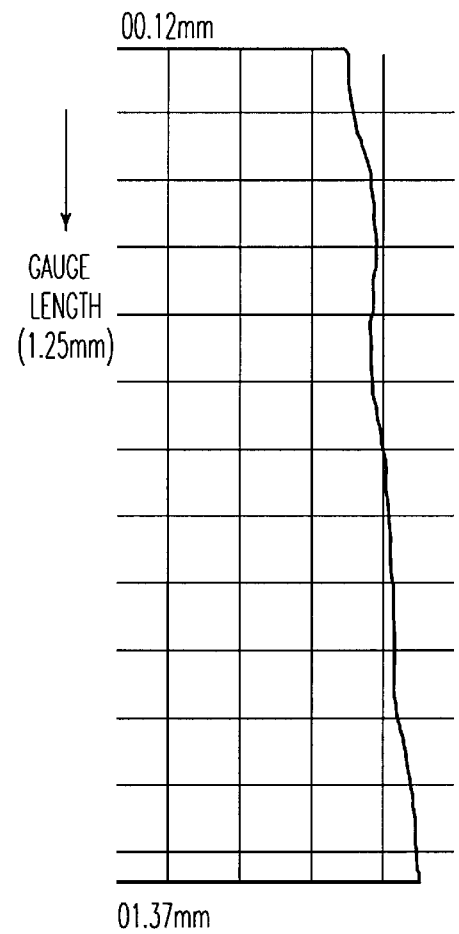
*FIG. 5A*
*PRIOR ART*
*FIG. 5B*

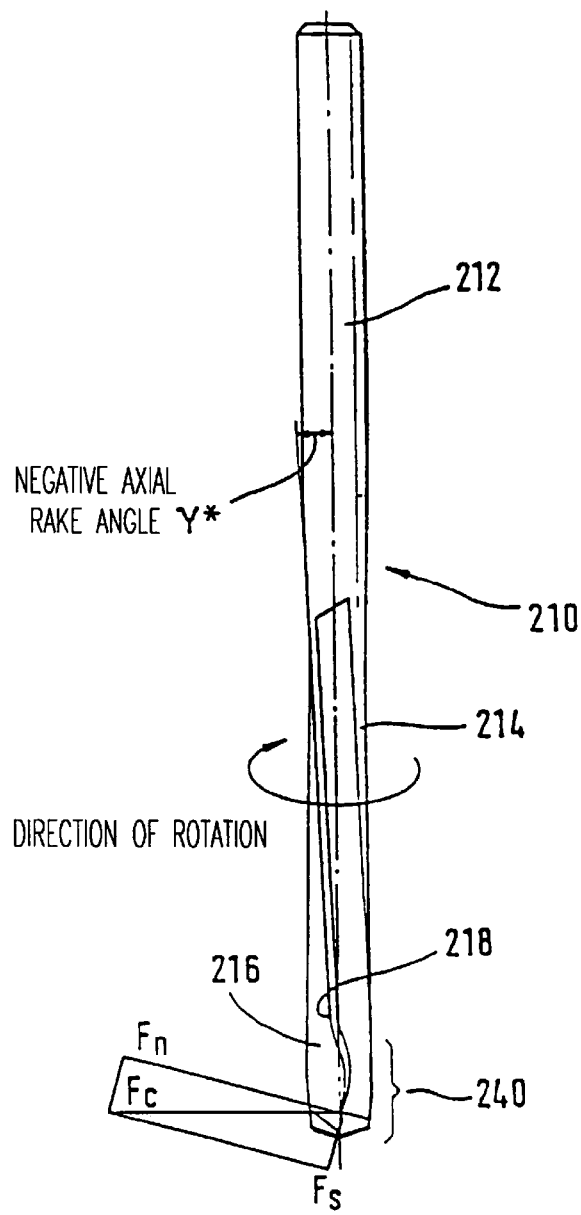
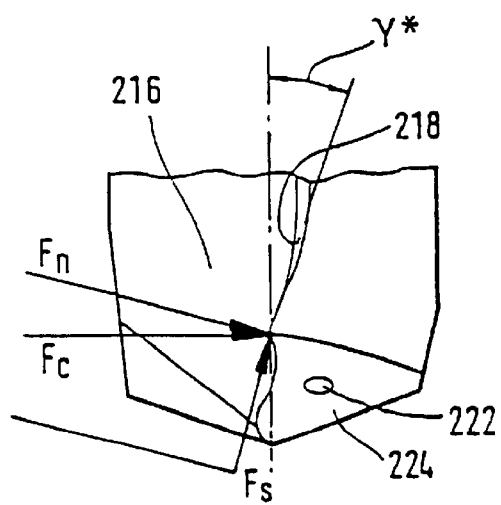

BORING BIT

BACKGROUND OF THE INVENTION

The invention relates to a drill bit, especially a drill bit with multiple cutting edges, for example with point-symmetric arrangement of cutting edges with primary and secondary cutting edge. In this connection, the invention encompasses the most diverse types of drill bits, such as drill bits for drilling in solid material, boring bits and even deep-hole drills.

DISCUSSION OF THE BACKGROUND

Even today, drill bits are still being made predominantly as twist drills, or in other words as drill bits with helical flutes. The pitch angle of the drill helix and thus the side rake angle of the drill is then usually between 0° and 50°, and so is positive. It is explained in more detail with reference to FIG. 8:

There is shown twist drill 10 with a shank 12 and a cutting part 14, in which helical flutes 16 are machined. The side rake angle is denoted by γ. This side rake angle γ is positive, because it opens counter to the direction of rotation Φ.

Positive rake angles are provided primarily because relatively favorable cutting conditions in the region of the secondary cutting edge can then be achieved in combination with high drill stability, and also because the chips can then be transported reliably out of the drillhole.

In the case of internally cooled drill bits, and especially drill bits for which the coolant is supplied under extremely high pressure, it is possible to use the coolant and lubricant to transport the chips out of the drillhole. In the case of short-cutting bits, therefore, a change to the use of straight-fluted bits has already been made, in order to take advantage of the higher torsional stiffness of straight-fluted bits as compared with the twist drill. However, the use of such bits has heretofore been limited to very short-cutting bits such as cast iron or AlSi alloys.

Intensive tests with conventionally shaped or fluted drill bits show that, especially in the case of slender bits, or in other words bits whose cutting part has a length-to-diameter ratio greater than 5, difficulties are encountered in stabilizing the bit in radial direction. Certainly it is possible to reduce these vibrations by modern ground surfaces, which frequently are made with the help of CNC-controlled machine tools. However, it has been found that even slight asymmetric wear phenomena greatly impair the radial stability of the drill bit, leading to adverse effects on drillhole quality even after a short tool life. Not only the dimensional accuracy of the drillhole, but also the surface quality is affected in this way. This influence is felt particularly strongly in bits in which a drill-bit support part of steel or high-speed steel is tipped with an edge material having greater wear resistance, such as carbide or cermet.

SUMMARY OF THE INVENTION

The object of the invention is therefore to provide a drill bit of the type described above with which drilling can be achieved smoothly and with little vibration, even under unstable conditions, so that drillholes with good surface and dimensional accuracy can be produced.

According to the present invention, the disposition of the secondary cutting edge is used for stabilization of the bit. The effect then achieved according to the present invention can be best illustrated by comparison of FIGS. 8 and 1:

In FIG. 8, a cutting force $F_c$ is shown, which points in a cutting direction. This cutting force $F_c$ represents the resultant of the normal force $F_n$ perpendicular to the cutting edge and the component $F_s$ of the cutting force. From FIG. 8 and FIG. 8A, which shows the force conditions at the corner of the cutting edge on a larger scale, it can therefore be seen that force component $F_s$ applies pressure on the helical part or the cutting part of drill bit 10. In other words, force component $F_s$ subjects the relatively slender drill body to lateral bending stress, and so high-strength bits, such as high-speed steel or carbide, must be used for the drill bit or for the cutting part.

In comparison with conventional drill bits according to FIG. 8 and FIG. 8A, the arrangement of the drill bit according to the present invention is disposed, as shown in FIGS. 1, 1A and 1B, such that secondary cutting edge 118 is inclined in the direction of rotation, or in other words in the cutting direction, over a substantial axial effective length, and thus has a negative side rake angle γ*. The resolution of cutting force $F_c$ into normal force component $F_n$ and a component $F_z$ perpendicular thereto means that force component $F_z$—as is obvious from FIG. 1A—applies tension to the drill bit or to cutting part 114. This tensile force $F_z$ has a stabilizing effect on the body of the drill bit, with the result that, even when the drill bit has extremely slender geometry, lateral bending can occur only at much larger lateral forces than is the case for drill bits of conventional design. Tensile force $F_z$ therefore acts as a preload on the cutting part and in this way increases the dynamic stability of the drill bit. It has been proved in tests that the drill bit, according to the present invention, drills much more smoothly and with much less vibration, even under unstable conditions, than do conventional drill bits, and so it has become possible to make drillholes with better surface and dimensional accuracy.

It is therefore important for the subject matter of the present invention that the disposition of the secondary cutting edge is used for stabilization of the drill bit against lateral forces. In this connection, it has been found that it is not absolutely necessary to form the entire secondary cutting edge with a negative side rake angle. To the contrary, it is sufficient to incline the secondary cutting edge in the cutting direction over a substantial axial effective length, in order to achieve, in the sum of the dynamic forces being developed, the stabilization of the bit explained hereinabove. In this way it is possible to dispose the side rake angle in the positive range over a short axial distance and then to allow this angle to change gradually to a negative angle.

The side rake angle is advantageously matched to the lip angle of the secondary cutting edge. In this way it is possible to improve chip formation and, in fact, even for the case that a relatively large negative side rake angle is used.

The principle according to the present invention can be transferred to the most diverse drill bits, even for single-lip drill bits. In the case of deep-hole drill bits, the principle according to the present invention is particularly effective, since these bits have an extremely high slenderness ratio and thus react particularly sensitively to compulsory stresses.

A further particularly favorable area of application is found in drill bits in which the arrangement of cutting edges is formed on a cutting part and the cutting part is seated on a support part. Such a drill-bit design has advantages, if economies in expensive high-strength material for the support part are to be achieved. The drill-bit design, according to the present invention, makes it possible to rely on the stabilizing effect of the secondary cutting edges to assist the weaker material for the support part.

It has been shown that the design according to the present invention of the secondary cutting edge disposition is directly applicable for the common materials of the cutting part. The concept according to the present invention does not lead to an overstressing of materials, and on the other hand, the drillhole receives much better dimensional accuracy and surface quality.

A further embodiment provides an extremely simple design of the bit, because the secondary cutting edges are automatically defined by the disposition of the flutes. However, it is not absolutely necessary to provide the flutes with uniform helical pitch over the entire length of the cutting part. To the contrary, the side rake angle can vary over the axial length of the drill bit, or in other words, that the secondary cutting edge remains inclined in cutting direction over a substantial axial effective length and has a negative side rake angle in this region.

Of special advantage is a further embodiment, which by virtue of the internal cooling-duct system, has the coolant and lubricant supplied under relatively high pressure so as to be usable to remove the chips from the drillhole against the negative conveying effect of the negative helix. It has been shown that, with a negative side rake angle in a range between −1° C. and −10° C., it is possible without other expedients to raise the coolant or lubricant pressure by about 20% compared with conventional pressures.

The load on the secondary cutting edge can be additionally reduced and this in turn can be used to improve the surface quality of the drillhole.

The stabilizing action according to the present invention of the drill design has a particularly positive effect when the bit is used and designed as a rotary bit.

BRIEF DESCRIPTION OF THE DRAWINGS

The present invention will be explained in more detail hereinafter with reference to schematic drawings wherein:

FIG. 1 shows a side view of the bit according to the present invention;

FIG. 1A shows detail IA according to FIG. 1;

FIG. 1B shows a partial cross-sectional view taken along line IB—IB of FIG. 1A;

FIG. 5A and FIG. 5B show measured curves for illustration of the waviness achievable at the bottom of the drillhole, wherein the measured result for a conventional drill bit is illustrated in FIG. 5A and the measured result for a drill bit according to the present invention is illustrated in FIG. 5B; and FIG. 6 and 6A, which correspond to the diagram according to FIG. 1, show a side view of a modification of the drill bit according to the present invention, wherein the negative side rake angle is formed only in a region outside a point portion;

DETAILED DESCRIPTION OF THE PREFERRED EMBODIMENTS

FIG. 1 shows a drill bit which is formed as a solid drill, or in other words which has a homogeneous body of one and the same material. High-speed steel, carbide, a ceramic material or a cermet can be used as the material for this purpose. The flutes denoted by 116 are bounded by a secondary cutting edge 118, which has a constant negative side rake angle $\gamma^*$ over the entire length of the cutting part. It must be emphasized, however, that the effect according to the present invention is also achieved reliably even if the negative side rake angle is negative only in portions, albeit over a substantial axial effective length. In this connection, it is sufficient for the bit to be provided over a short distance with a positive side rake angle, which then changes gradually to a negative side rake angle.

Reference symbol 122 denotes an outlet opening for an internal cooling duct. The outlet opening is disposed in main flank 124 of drill 110, so that the flute can be efficiently flushed with coolant or lubricant. In the case of relatively deep drillholes, or in other words drillholes with a depth which is larger than two times the drill diameter, it is advantageous to work with coolant or lubricant pressures about 20% higher than the conventional pressures.

FIG. 1B shows a partial section of a cutting operation along line IB—IB. The disposition of the flute is denoted by 116 and the phase by 126. The dot-dash line denotes a hypothetical disposition of a modified flute 116*, whose disposition can influence lip angle κ in the region of secondary cutting edge 118. Advantageously this lip angle κ is matched sufficiently to the magnitude of negative side rake angle $\gamma^*$ that favorable cutting conditions are still established. Obviously this angle will be selected as a function of the material to be machined.

Figure 2A:
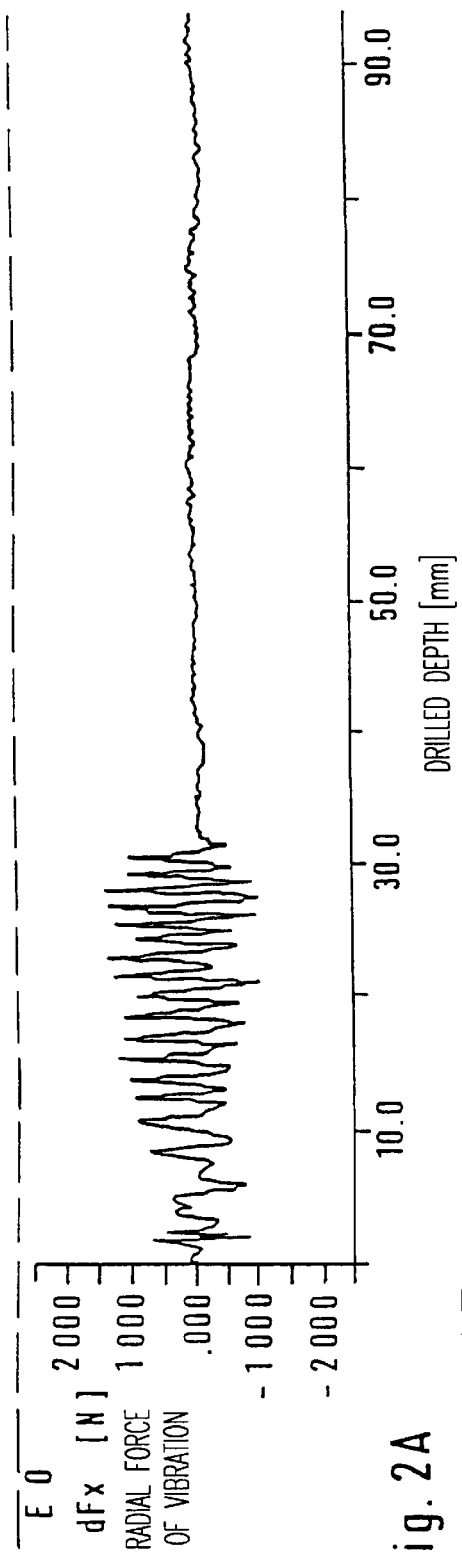
FIG. 2A shows a measured curve of the radial force of vibration over the drilled depth during use of a conventional drill bit.
Figure 2B:
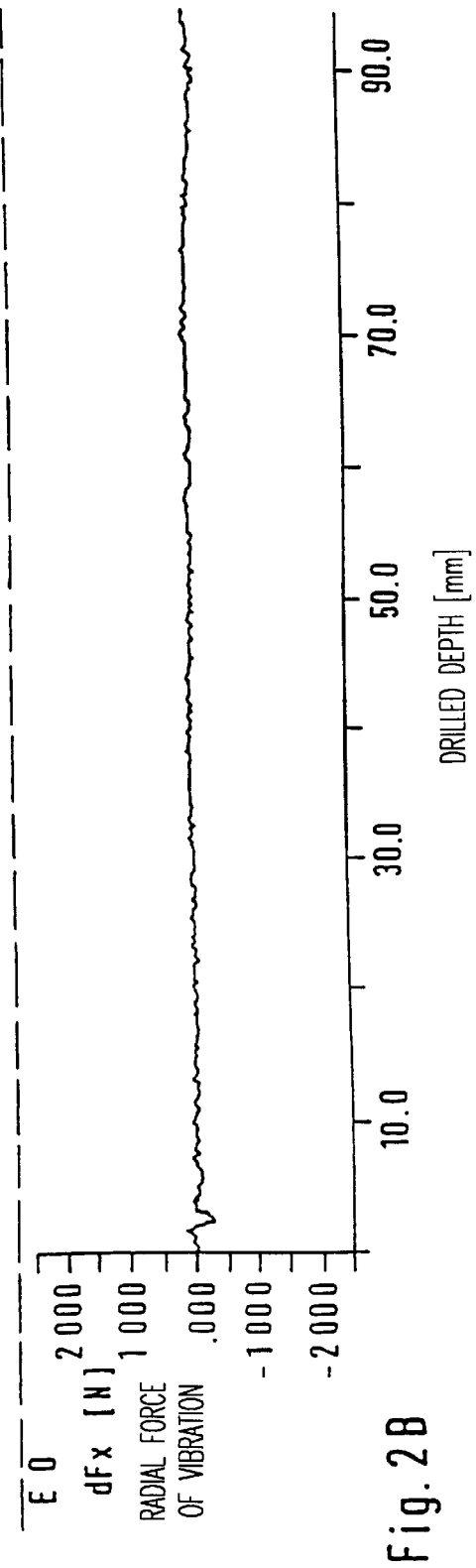
FIG. 2B shows a diagram corresponding to FIG. 2A of the measured curve for a bit with design according to the present invention.

The results of tests performed with conventional drill bits and with bits according to the present invention will be explained hereinafter with reference to FIG. 2 to 5. There was used a "ratio drill" of RT150 GG type with a ground surface shaped like the envelope of a cone and a diameter of B=10 mm, in order to make a hole whose depth corresponded to ten times the drill diameter. A cutting speed vc of 380 m/men was used in combination with a feed f of 0.16 mm per revolution. The material to be machined was $AlSi_9Cu_3$. The comparison test was performed with a negative pitch of the helix with an angle $\gamma^*$ of 4°. The other parameters were identical. FIG. 2 shows the curve of radial force dFx of vibration versus drilled depth. Extremely intensive vibration behavior is seen up to a drilled depth of 30 mm. In comparison, the test, with the bit according to the present invention, exhibits an extremely small and constant tendency to vibration.

Figure 3A:
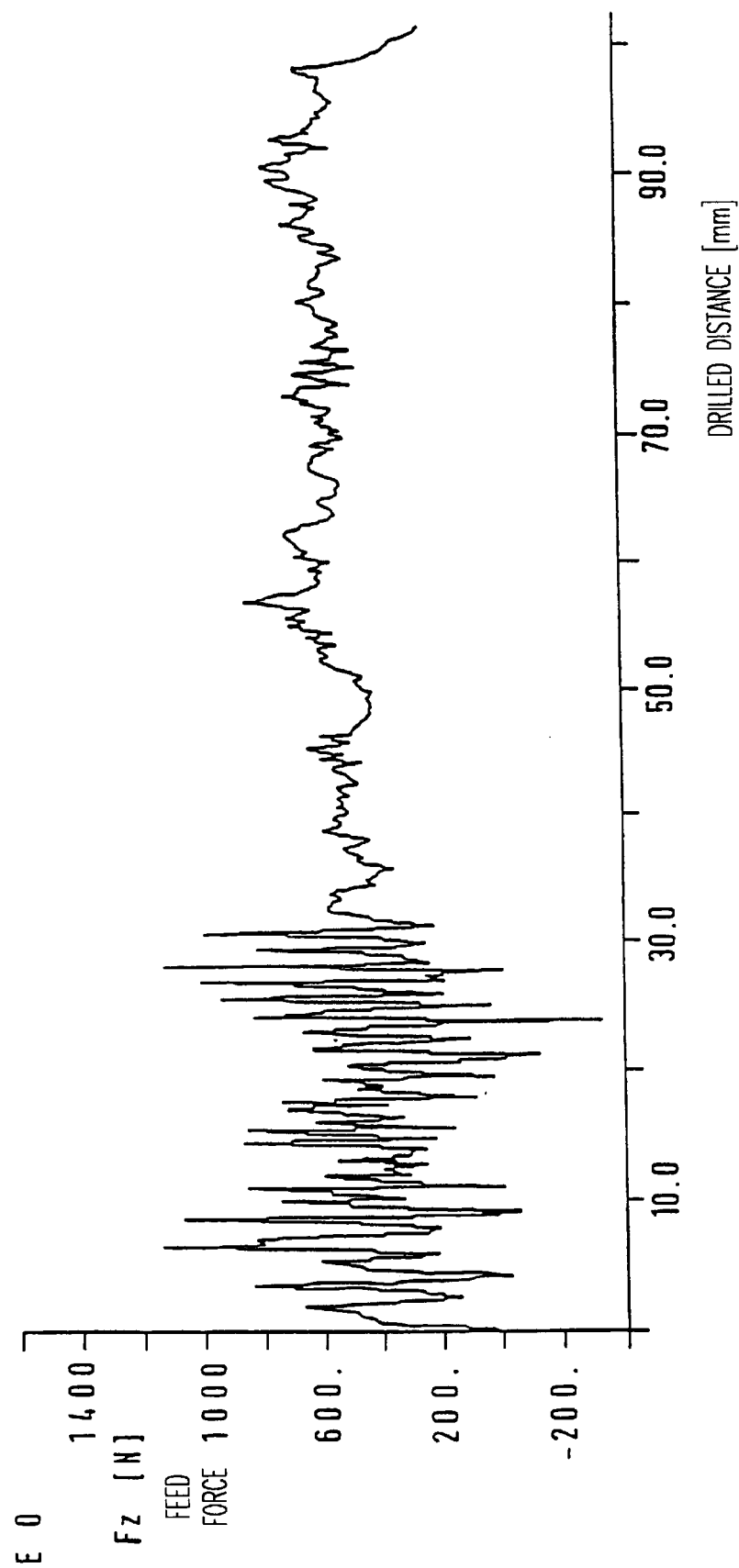
FIG. 3A shows a measured curve for the feed force over the drilled distance for a conventional bit.
Figure 3B:
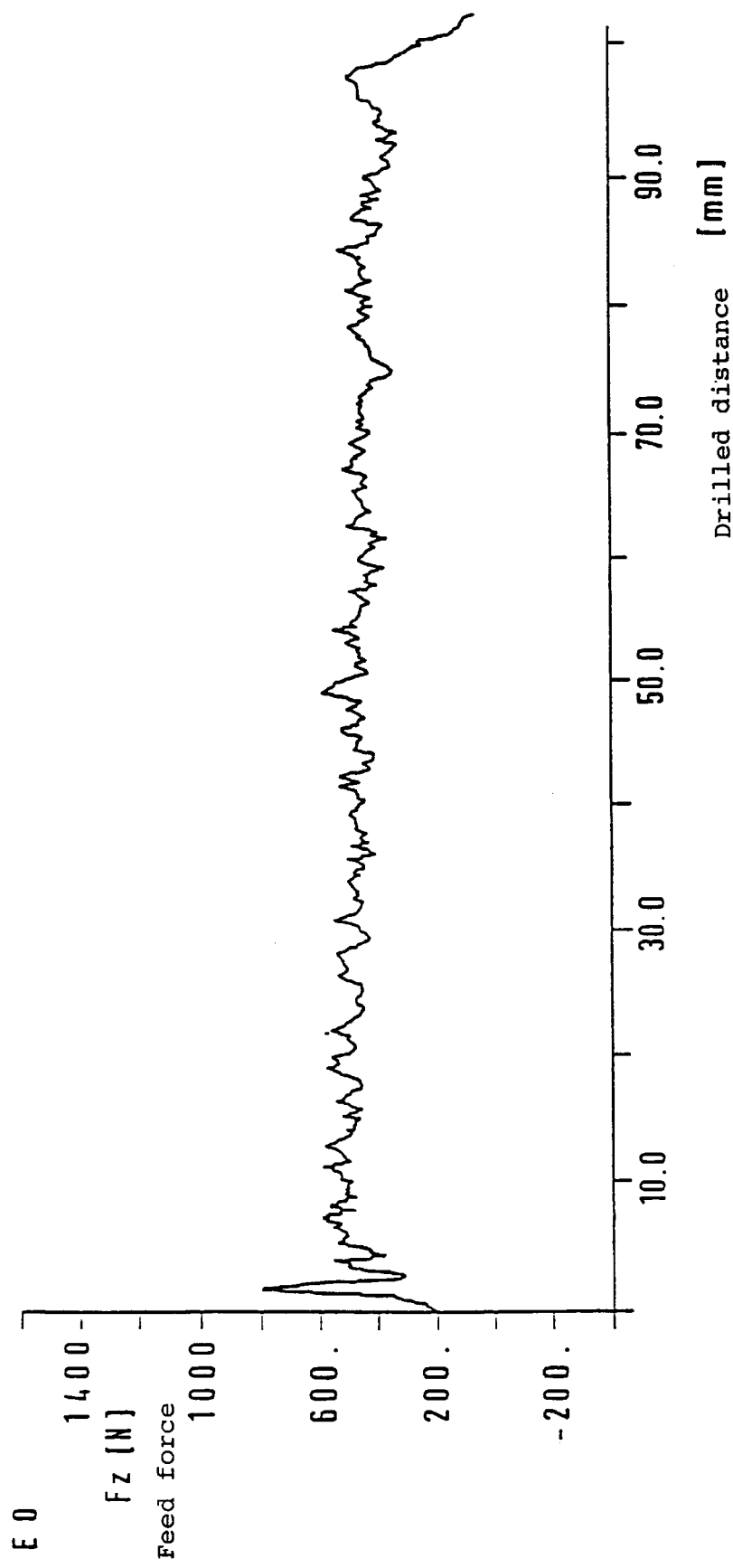
FIG. 3B shows a diagram corresponding to FIG. 3A of the measured curve for a bit according to the present invention.

FIG. 3A and 3B show the curve of feed force $F_z$ versus drilled distance. Here also, the distribution of forces is obviously unsteady when a conventionally designed drill bit is used, the fluctuations being extremely large up to a drilled distance of 3×d. In contrast, FIG. 3B shows relatively small deflections of feed force only at the beginning of the drill bit, and very good stabilization after a short drilled distance.

Figure 4A:
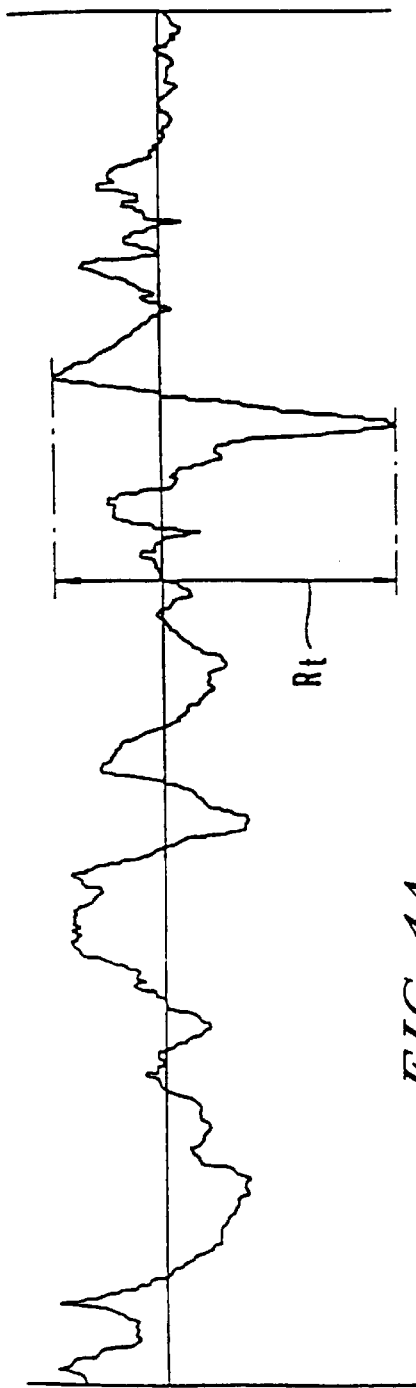
FIG. 4A and FIG. 4B show measured curve s for illustration of the different roughnesses of drillholes achievable with a conventional drill bit and a drill bit according to the present invention, respectively.
Figure 4B:
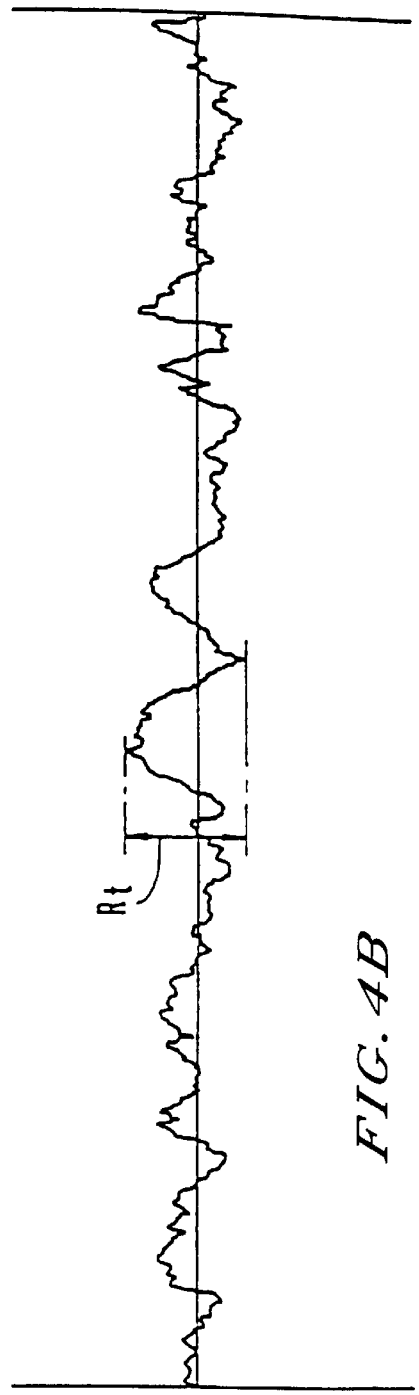

FIG. 4A and 4B compare the roughnesses of the achievable hole surfaces. A gauge length of 0.25 mm was chosen in each case.

FIG. 4A shows the roughness established during use of a conventional bit, while FIG. 4B shows the roughness during use of a bit according to the present invention. In this case drilling was performed with the same bit indicated hereinabove, but in GG25 material. The average peak-to-valley according to FIG. 4A was 1.99 µm and the maximum peak-to-valley height was 18.8 µm. In contrast, in the test result of FIG. 4B with the drill according to the present invention, the average peak-to-valley height Ra was 1.0 µm and the maximum peak-to-valley height was 8.6 µm.

Finally, as is evident from FIG. 5A and 5B, better quality of the hole from the macroscopic viewpoint is also achieved during use of the drill bit according to the present invention. For this purpose, the waviness of the bottom of the hole was measured. FIG. 5A shows the measured result in the test with the conventional bit. It is apparent from this figure that very pronounced waviness of the bottom of the hole is developed. In contrast, as shown in FIG. 5B, a very smooth surface of the bottom of the hole can be achieved with the bit according to the present invention.

A further modification of the drill bit according to the present invention is shown in FIG. 6. To simplify the description, those elements and portions of the drill bit which correspond to the components of the bit according to FIG. 1 are denoted with like reference symbols, but are prefixed with "2" instead of "1". The bit according to FIG. 6 and 6A differs from the initially described bit in that the negative rake angle γ* is provided only in a region outside a point portion 240. In point portion 240 itself, the side rake angle is positive, as is evident from FIG. 6A. Nevertheless, the bit is sufficiently stabilized by the remaining disposition of secondary cutting edge 218 with its negative side rake angle, and so the tendency to vibrate is reduced. Although an outlet opening 222 of an internal cooling-duct configuration is shown in FIG. 6A, it can also be omitted.

Figure 7:
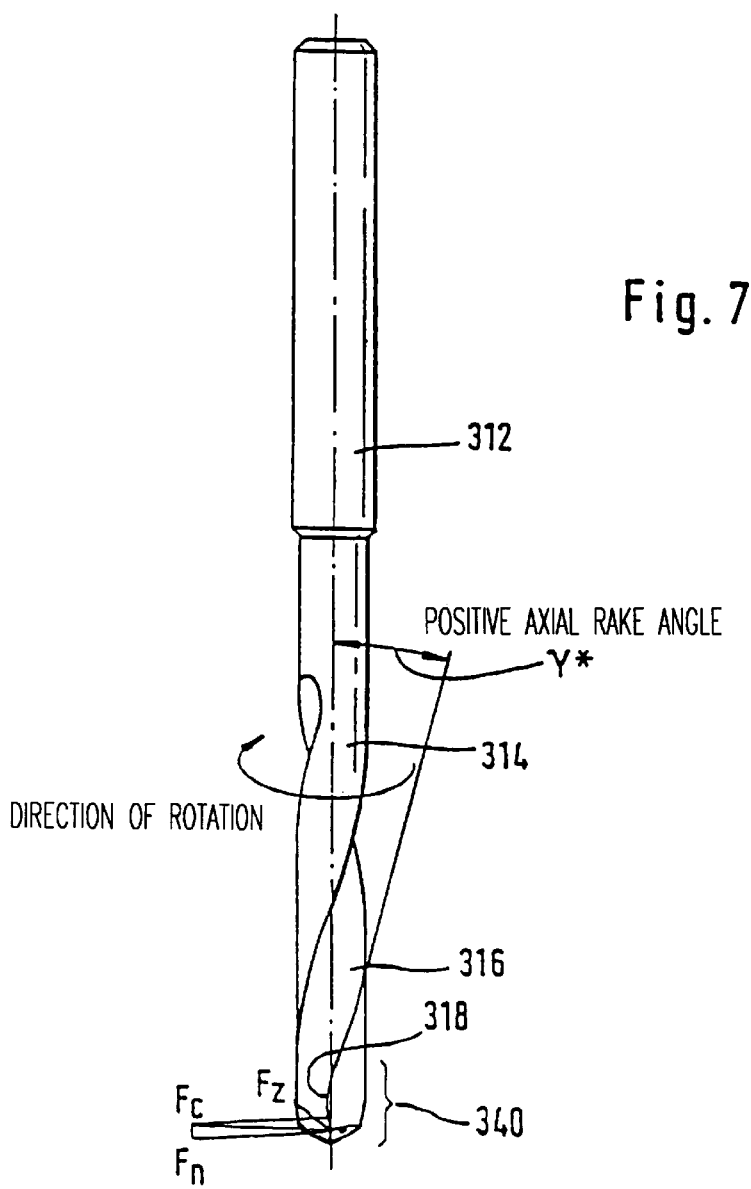
FIG. 7 and 7A show diagrams corresponding to FIG. 6 and 6A, respectively, of a modification of the drill bit according to the present invention, wherein the negative rake angle is present only in a point portion.
Figure 7A:
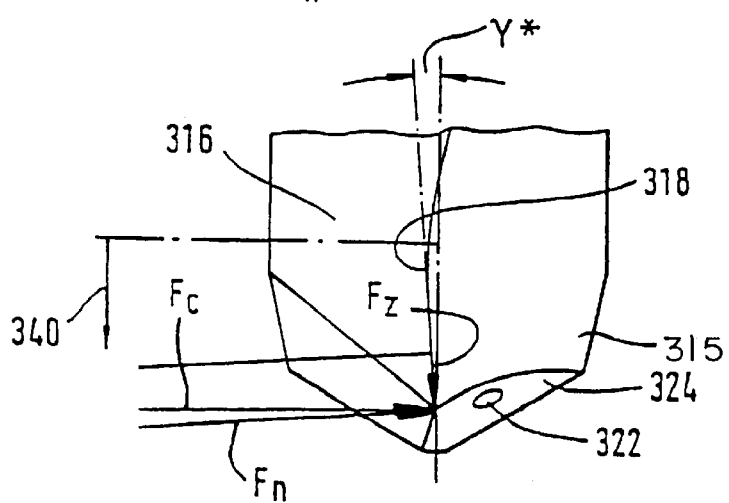
Figure 8:
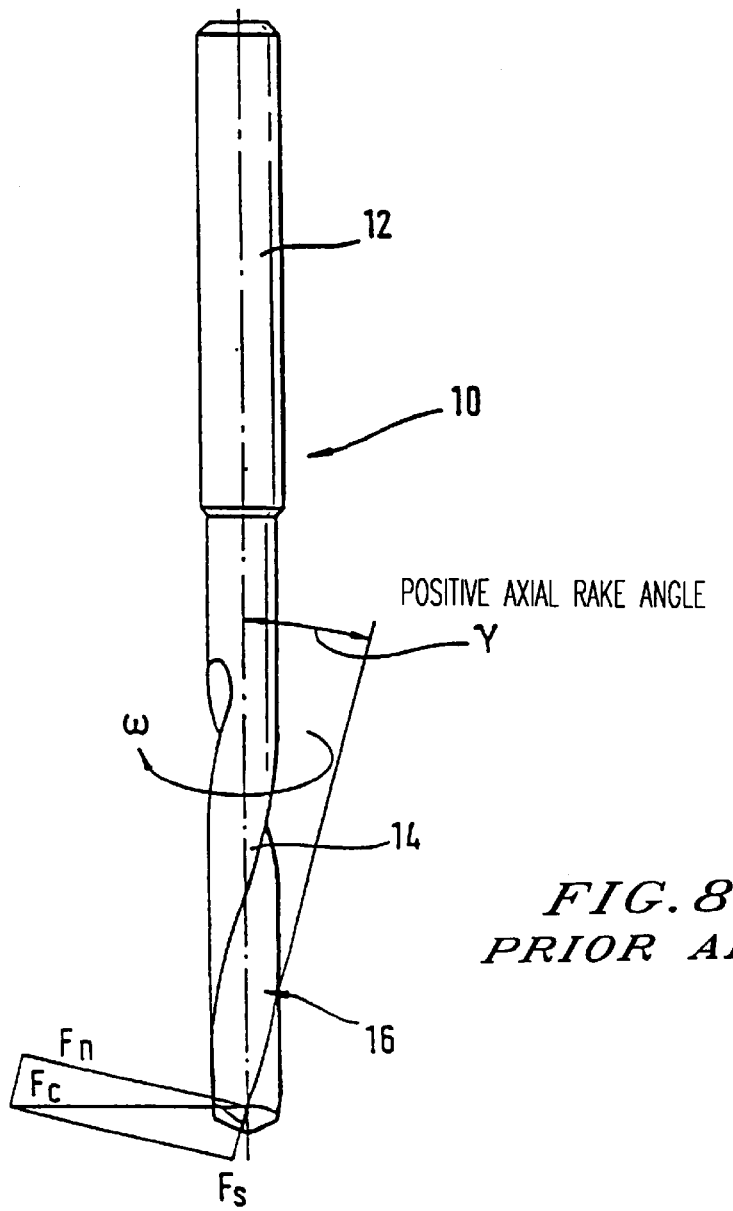
FIG. 8 and 8A show views corresponding to FIG. 1 and 1A of a conventionally designed drill bit.
Figure 8A:
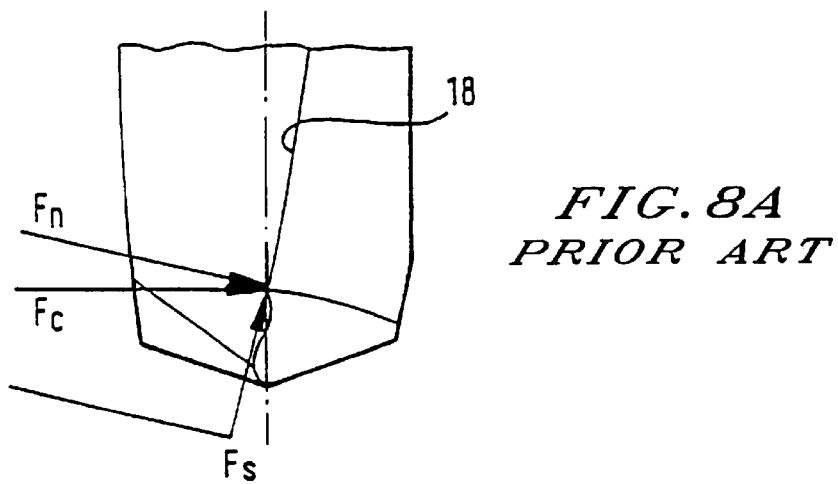

Finally, FIG. 7 shows a configuration of a drill bit, in which the orientation according to the present invention of secondary cutting edge 318 for formation of a negative side rake angle, is provided exclusively in a point portion 340. Side rake angle γ* is positive in the rest of cutting part 314. It is evident from the diagram, according to FIG. 7A, that the effect exerted by tensile force $F_z$ for stabilization of the drill occurs only in portion 340, and so this bit is particularly suitable for drilling holes that are not very deep, up to a depth range of approximately 3 to 4×d (drill diameter). The bit according to FIG. 7 is also particularly suitable for drilling without coolant, even though the outlet opening for an internal cooling duct is denoted by 322 in FIG. 7A. Even in this configuration of the bit, it is obvious that a cutting insert for forming the main and/or secondary cutting edge can be provided in point portion 340.

Modifications of the practical examples described hereinabove are obviously possible without departing from the basic ideas of the present invention. For example, the dynamically stabilizing effect of the disposition of the side rake angle can also be achieved by considering, instead of the cutting direction, the effective direction of cut, which is obtained by vector addition of cutting direction and feed. In this case, the side rake angle must be increased by the angle of the effective direction of cut (DIN 1412). Furthermore, it is not absolutely necessary to provide the bit with rotationally symmetric geometry of the cutting edge. It is equally possible to achieve vibrational stabilization with a single-lip deep-hole drill bit.

The present invention therefore provides a drill bit, especially a drill bit having multiple cutting edges with preferably point-symmetric arrangement of cutting edges with primary and secondary cutting edge, which is inclined relative to the axis of the drill bit. For stabilization of the bit against vibrations caused by cutting forces, the secondary cutting edge is inclined in the cutting direction over a substantial axial effective length, and thus has a negative side rake angle (γ*).

What is claimed is:

1. A drill bit comprising:
   a shank formed along a first end of said drill bit;
   a cutting part formed along a second end of said drill bit opposite said first end;
   a central longitudinal axis through both said shank and said cutting part;
   at least primary and secondary cutting edges designed so that said drill bit drills into a full material of a metallic work piece to make a drillhole, said at least primary and secondary cutting edges being arranged in a point-symmetric arrangement, said primary cutting edge being located at said second end of said drill bit, said secondary cutting edge being located along a substantial axial length of said cutting part, and said at least primary and secondary cutting edges are inclined relative to said central longitudinal axis of said drill bit;
   a flute formed along a substantial axial length of said cutting part;
   an axial rake angle formed by helically disposing said flute, said secondary cutting edge being inclined in a cutting direction over a substantial axial effective length to thereby form a negative axial rake angle such that dynamic forces acting on said primary cutting edge apply tension to said drill bit, said axial rake angle ranging from between −1° to −10°.

2. The drill bit according to claim 1, wherein said side rake angle is matched to a lip angle of said secondary cutting edge.

3. The drill bit according to claim 1, wherein said arrangement of said cutting edges is formed on a cutting part.

4. The drill bit according to claim 3, wherein said cutting part is seated on a support part, which is made of any one of steel, high-speed steel, carbide, ceramic, and cermet.

5. The drill bit according to claim 3, wherein said cutting part is formed by a cutting insert.

6. The drill bit according to claim 5, wherein said cutting insert is joined detachably to said support part.

7. The drill bit according to claim 5, wherein said cutting insert is formed by a one-piece tip.

8. The drill bit according to claim 3, wherein said cutting insert is made of any one of high-speed steel, carbide, cermet, ceramic, polycrystalline diamond, and CBN cubic boron nitride.

9. The drill bit according to claim 1, wherein said point-symmetric arrangement of said cutting edges is formed in one piece with said drill bit.

10. The drill bit according to claim 9, wherein said drill bit is made of any one of high-speed steel, carbide, ceramic material, and cermet.

11. The drill bit according to claim 1, further comprising additional flutes corresponding to a number of said primary cutting edges.

12. The drill bit according to claim 11, wherein a pitch angle of a helix of said helical disposition on said secondary cutting edge corresponds to said negative side rake angle.

13. The drill bit according to claim 1, wherein said drill bit is formed as a deep-hole drill having an extremely high slenderness ratio thereby causing said drill bit to react particularly sensitively to compulsory stresses.

14. The drill bit according to claim 1, further comprising an internal coolant and a lubricant duct system with at least one outlet opening in a primary flank.

15. The drill bit according to claim 1, wherein an entirety of said secondary cutting edge is angled in a cutting direction.

16. The drill bit according to claim 1, wherein said secondary cutting edge has a negative side rake angle only starting from a predetermined axial distance form a point portion of said drill bit.

17. The drill bit according to claim 1, further comprising an internal cooling-duct system wherein a coolant and a lubricant are supplied under relatively high pressure to remove chips from said drillhole against a negative conveying effect of a negative helix.

18. The drill bit according to claim 1, further comprising another secondary cutting edge following said secondary cutting edge.

\* \* \* \* \*